Sept. 23, 1947. E. M. McNATT Re. 22,919

INTEGRATING GRADIOMETER

Original Filed Aug. 8, 1941 2 Sheets-Sheet 1

Eugene M. McNatt INVENTOR.

BY P. J. Whelan

ATTORNEY

INTEGRATING GRADIOMETER

Original Filed Aug. 8, 1941 2 Sheets-Sheet 2

Eugene M. McNatt INVENTOR.
BY P. J. Whelan
ATTORNEY

Reissued Sept. 23, 1947

Re. 22,919

UNITED STATES PATENT OFFICE 22,919

INTEGRATING GRADIOMETER

Eugene M. McNatt, Tulsa, Okla., assignor to Standard Oil Development Company, a corporation of Delaware Original No. 2,320,290, dated May 25, 1943, Serial No. 405,910, August 8, 1941. Application for reissue May 24, 1944, Serial No. 537,167

10 Claims. (Cl. 33—141.5)

The present invention is directed to a method and apparatus for measuring or indicating the difference in elevation between two points. In most types of geophysical prospecting, and in other fields, the measurements made must be corrected for elevation. Accordingly, in the practice of most geophysical methods, there is an elevation survey made simultaneously with the geophysical survey. The necessary for this elevation survey adds considerably to the expense of the prospecting method and, in addition, is time consuming.

It is the principal object of the present invention to provide a method and apparatus for making elevation surveys while traveling in a vehicle over an area to be surveyed. An additional object of the present invention is the provision of an apparatus of the character described, which will be substantially unaffected by changes in speed of the vehicle or undulations of the terrain.

A further object of the present invention is the provision of a device of the character described, in which means are provided for subjecting a photocell to flashes of light of a number proportional to the distance covered by the vehicle and to the sine of the angle which the longitudinal axis of the vehicle makes with the horizontal.

Further objects and advantages of the present invention will appear in the following detailed description of the accompanying drawings, in which—

Figure 6:
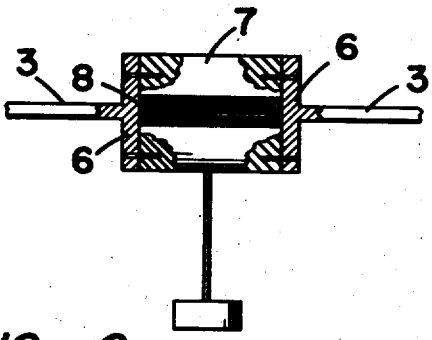
Figure 6 is front elevation, partly in section, of the acceleration compensator with the magnetic element removed.
Figure 7:
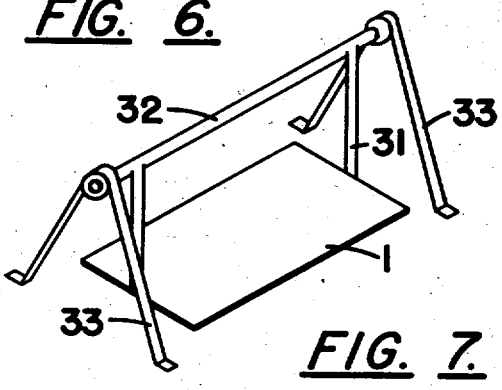
Figure 7 is a perspective view of the supporting platform for the apparatus.

Referring to the drawings in detail, numeral 1 designates a flat base which may rest on the floor of the vehicle, but which is preferably carried by arms 31 at its either end, said arms depending from a bar 32 pivotally mounted in uprights 33. To avoid friction the bar is journaled in ball bearings. On one end of the base is a pair of spaced uprights 2 on which is journaled a shaft 3. The shaft carries a pair of spaced aluminum discs 4. Around the periphery of each of these discs is arranged a plurality of magnets 5, suitably supported by the uprights 2. Thus, the periphery of the disc cuts through a plurality of magnetic fields, whereby when the disc rotates eddy currents are set up in it, which, in conjunction with the magnetic fields, damp the movement of the disc. The shaft 3, (see Fig. 6) is broken intermediate its ends. It carries a pair of spaced plates 6, to which is bolted an armature 7. Wound axially on the armature is a coil 8. In spaced relation to the armature is a permanent magnet 9, which may be suitably supported by legs 10, fixed to the base 1. Suspended from the armature is a pendulum 11.

Fixed to the shaft 3 in such a manner as to have its axis of rotation coincident with the axis of the shaft is a mirror 12.

Spaced from the uprights 2 a selected distance, there is fixed to the base 1 a post 13. Near its bottom, this post carries a collar 14, which forms a bearing track for a worm gear 15. Fixed to the upper face of this gear is a shutter 16. This shutter may have any desired configuration, meeting the requirements hereinafter specified. In the embodiment shown the shutter, if laid flat, would resemble two saw teeth. The worm gear is driven by a worm 34 which is connected through gearing in the gear box 17 to a flexible shaft 18, geared to the drive shaft of the vehicle. Also driven by a suitable gearing in the gear box is a flexible shaft 19, which is supported by the base 1 by suitable brackets, and which carries at its end a toothed disc 20. Mounted behind the disc 20 is a light source 21, arranged so as to cast a beam of light on mirror 12 through the notches on the periphery of disc 20. The light source is the pin hole type. Arranged in the path of travel of the light from source 21 to mirror 12 is a lens 22, so selected as to focus the beam of light on the surface of the shutter 16.

Fixed to the post 13 is an elliptical mirror 23, which, in this embodiment, constitutes part of an ellipse of which the axis of shaft 3 is one of the focal points. Arranged on the axis of the ellipse, of which mirror 23 is a part, at the other focal point of said ellipse, is a photocell 24. With this arrangement of parts light reflected from mirror 12 to the mirror 23 will in turn be reflected onto the photocell 24. The output of the photocell is delivered to an amplifier 25 which in turn feeds a scaling circuit contained in unit 26. This scaling circuit may be one of the many known types, which serve the purpose of dividing a pulse input by some multiple of the number of pulses it is desired to deliver. Thus, the scaling circuit may be so designed that if 128 pulses per second are delivered to it, it will in turn put out two pulses per second. The output of the scaling circuit is delivered to a counter 27 of the electrical impulse type.

As will appear from the foregoing description, the operation of the apparatus shown is based on the delivery to the counter of a number of pulses which will depend upon the distance travelled by the vehicle and on the sine of the angle which the longitudinal axis of the vehicle makes with the horizontal. There are, accordingly, certain requirements for the type of shutter employed. It must be one which, for a given deviation of the vehicle from the horizontal, will transmit a number of light flashes proportional to the sine of the angle which the vehicle makes with the horizontal.

Figure 1:
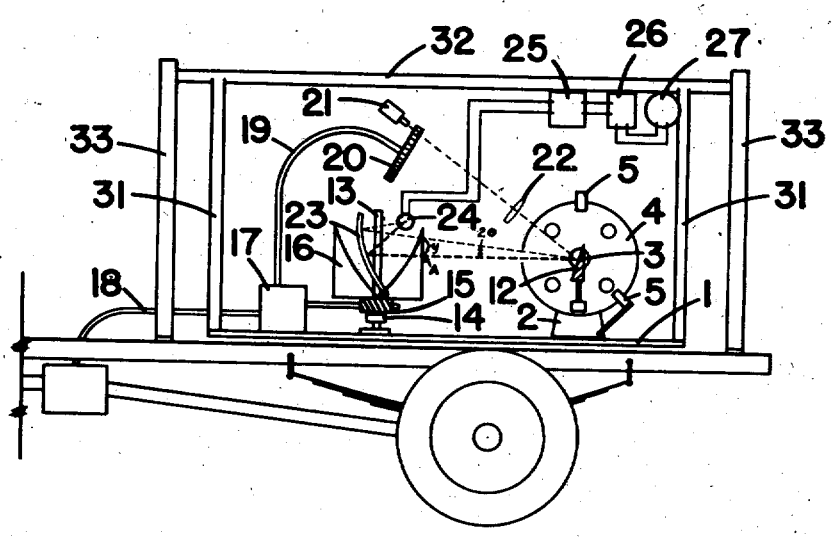
Figure 1 is a side elevation partly in section of one type of apparatus according to the present invention.
Figure 2:
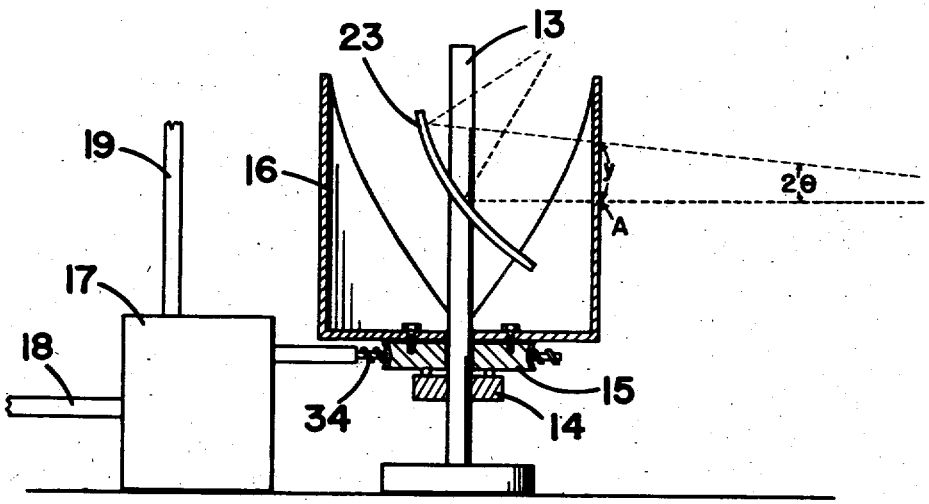
Figure 2 is a side elevation, partly in section, of the shutter, which forms part of the combination shown in Figure 1.
Figure 3:
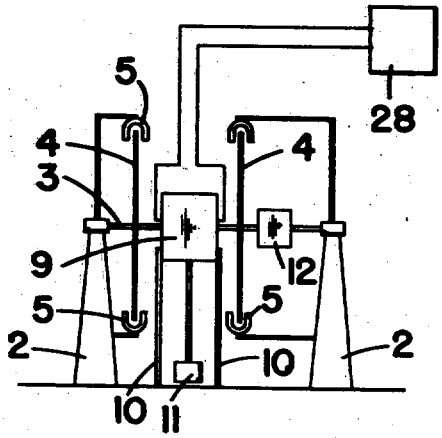
Figure 3 is a front elevation of the pendulum system.

To illustrate, the arrangement shown in Figure 1 is in horizontal position, in which the beam of light from the mirror 12 strikes the shutter at point A, which may be considered the null point. If the vehicle encounters a rise, the point of incidence of the light beam on the shutter will be below A, while if the vehicle encounters a drop, the point of incidence will be above A. If it be assumed that the vehicle encounters a drop which causes its longitudinal axis to make an angle $\theta$ with the horizontal, the light beam from mirror 12 will deviate from the horizontal by angle equal to $2\theta$. It will be understood, of course, that the mirror itself, in this case, will deviate from the null position by an angle equal to $\theta$, but this angle will be doubled in the reflected beam. The point at which the beam of light will then strike the surface of the shutter 16, will be above the horizontal a distance equal to $y$. At this elevation of the shutter, the open space must be of a width equal to $a+k \sin \theta$, where $a$ equals the width of the shutter opening at the height on the shutter corresponding to the null point A, and $k$ is a constant, depending upon the distance between the mirror and the shutter, and the dimensions of the shutter. It is to be emphasized that where the width of the shutter is referred to, reference is made to the circumferential distance between edges of the shutter. In effect, therefore, $a$ actually represents that fraction of the period of revolution of the shutter during which the light beam passes through the shutter when the vehicle is in the horizontal position. Likewise, for any value of $y$, the shutter must be open for a period corresponding to $a+k \sin \theta$.

Thus, the shutter contributes to the overall result the desired relationship between the period for which the light cell is exposed to light and the inclination of the vehicle to the horizontal. The number of pulses recorded, however, also must be proportional to the distance travelled by the vehicle. This relationship is brought into the result by the notched disc 20, which, as previously stated, revolves at a speed bearing a fixed ratio to the speed of travel of the vehicle. It may be noted that the greater the number of notches on the periphery of the disc 20, the more accurate will be the results for a given ratio of disc speed to vehicle speed. The accuracy can also be increased by increasing this latter ratio.

In one embodiment of the present invention it has been found that 1500 flashes of light per revolution of the shutter is satisfactory.

Figure 4:
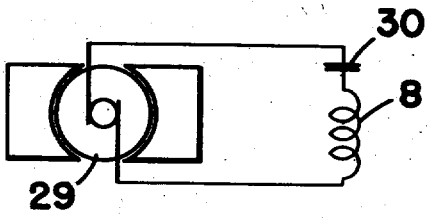
Figure 4 is a diagrammatic view of the acceleration compensator.
Figure 5:
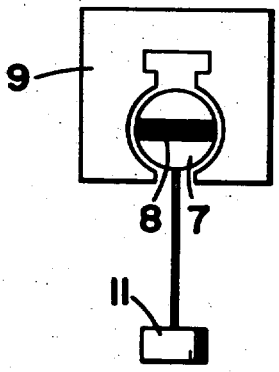
Figure 5 is a detail of the construction of the acceleration compensator in end view.

In order to avoid any errors which might be incurred by reason of movement being imparted to the pendulum by sudden acceleration or deceleration of the vehicle, the compensator, composed of armatures 7 and coil 8 previously referred to, is provided. Coil 8 is connected to an accelerometer 28, which, as shown in Figure 4, consists of a D. C. generator 29, which generates voltage proportional to its speed of rotation. This generator is geared directly to the drive shaft of the vehicle, and accordingly generates voltage proportional to the speed of the drive shaft. One output terminal of the generator is connected to the coil 8, and the other output terminal is connected to one plate of the condenser 30, the other plate of which is connected to the coil 8. If the speed of the drive shaft remains constant, no current passes through the condenser. Any change of speed of the drive shaft will give rise to a change in value of the voltage output of the generator and this change in voltage will cause a current to flow through the condenser, and thus through coil 8. Since coil 8 is in a magnetic field, any current flowing through coil 8 will give rise to a torque opposing the movement of the armature on which the coil is mounted, provided it is properly wound on the armature for this purpose. Since the pendulum is rigidly fixed to the armature, the current in coil 8 will have the effect of curbing the tendency of the pendulum to oscillate upon acceleration or deceleration of the vehicle.

It is to be understood that the particular embodiment described above is simply one embodiment of the present invention. Many variations in the arrangement of the elements and the particular elements themselves are possible without departing from the principle of operation. For example, the shutter may assume many shapes, which will satisfy the relationship that for a given value of $y$ the opening time of the shutter must have a value corresponding to $a+k \sin \theta$. In fact, the shutter can be so constructed that $a$ is 0, and, therefore, need not be brought into the calculations. This would, of course, necessitate two separate photocells and associated counters, one for positive values of $\theta$, and one for negative values of $\theta$.

In the use of the device, the values recorded by the operator are the distance traveled and the number of counts on the counter. With this data, the change in elevation can be calculated from the equation $$b\Delta H = \Delta N - c\Delta L$$

in which $\Delta H$ is the difference in elevation between the two points in question, $\Delta N$ is the number of counts recorded between the two points, $\Delta L$ is the odometer reading between the two points in question, and $c$ and $b$ are calibration constants depending upon the dimensions of the apparatus. $c$ may be determined by running the apparatus between two points having the same elevation. Thus, $\Delta H$, in the equation above, is zero, and $c$ is equal to $\Delta N$ divided by $\Delta L$. Similarly, after $c$ has been determined, $b$ may be determined by running between two points having a known elevation difference.

The nature and objects of the present invention having been thus described and illustrated, what is claimed as new and useful and is desired to be secured by Letters Patent is:

1. In a method for determining variations in elevation of terrain traversed by a vehicle the steps which comprise creating a repeating signal of a frequency proportional to the rate of travel of the vehicle, transmitting to an indicating device a number of repetitions of said signal proportional to the sine of the angle which the longitudinal axis of said vehicle makes with the horizontal, and exposing for observation the repetitions of the signal so transmitted.

2. In a method for determining the changes in elevation of terrain traversed by a vehicle the steps which comprise producing periodic light flashes of a frequency which varies with the speed of travel of the vehicle, transmitting to a light sensitive indicator a number of said flashes proportional to the sine of the angle which the longitudinal axis of the vehicle makes with the horizontal, and exposing for observation a value which is a function of the number of light flashes reaching said indicator.

3. An apparatus for determining the variations in elevation of terrain traversed by a vehicle comprising means mounted in said vehicle for creating a signal, means for controlling the frequency of said signal as a function of the speed of travel of said vehicle, means for transmitting said signal to an indicator, means interposed between the point of creation of said signal and the indicator for fixing the number of signals reaching the indicator at a value proportional to the sine of the angle which the longitudinal axis of the vehicle makes with the horizontal, and means for exposing for observation a value proportional to the number of signals which reach the indicator.

4. An apparatus for determining variations in elevation of terrain traversed by a vehicle comprising a light source in said vehicle, means for creating flashes of light from said source of a frequency proportional to the speed of travel of said vehicle, light sensitive indicating means arranged to receive said light flashes, and means interposed between said light source and said indicating means for blocking off a predetermined number of said light flashes fixed so that the number of light flashes reaching said indicating means is a function of the sine of the angle which the longitudinal axis of the vehicle makes with the horizontal.

5. An apparatus for determining the variations in elevation of terrain traversed by a vehicle comprising a base parallel with the longitudinal axis of said vehicle and suspended for free lateral movement carried thereby, a horizontal shaft mounted on said base perpendicularly to the longitudinal axis of said vehicle, a pendulum carried by said shaft, a mirror mounted on said shaft, a light source arranged to direct its beam on said mirror, means interposed between said light source and said mirror for cutting off said light beam with a periodicity depending upon the speed of travel of said vehicle to thereby produce light flashes, a second mirror arranged to receive the reflection of said light flashes from said first mirror, a shutter interposed between said mirrors for transmitting only a number of said flashes proportional to the sine of the angle which the longitudinal axis of said vehicle makes with the horizontal, said shutter being driven by the drive shaft of said vehicle, a photocell arranged to receive reflected flashes of light from said second mirror, and means for indicating the responses of said photocell to said flashes of light 6. An apparatus according to claim 5 in which the second mirror is part of an ellipse having as its focal points the first mentioned mirror and the photocell.

7. An apparatus according to claim 5 in which means are provided for damping the movement of the shaft carrying the pendulum.

8. An apparatus according to claim 5 in which electrical means are provided for exerting a force on said shaft in opposition to a force exerted thereon by acceleration or deceleration of the vehicle.

9. In a method for determining variations in elevation of terrain traversed by a vehicle, the steps which comprise creating a repeating signal of a frequency proportional to the rate of travel of the vehicle, transmitting to an indicating device a number of repetitions of such signal dependent upon the angle which the longitudinal axis of said vehicle makes with the horizontal, and exposing for observation the repetitions of the signal so transmitted.

10. An apparatus for determining variations in elevation of terrain traversed by a vehicle comprising means mounted in said vehicle for creating a signal, means for controlling the frequency of said signal as a function of the speed of travel of said vehicle, an indicator, means for transmitting said signal to said indicator, means interposed between the point of creation of said signal and the indicator for fixing the number of signals reaching the indicator at a value dependent upon the angle which the longitudinal axis of the vehicle makes with the horizontal.

EUGENE M. McNATT.

REFERENCES CITED

The following references are of record in the file of this patent:

UNITED STATES PATENTS

| Number | Name | Date |
|---|---|---|
| 2,208,738 | Hines | July 23, 1940 |
| 2,362,616 | Cloud | Nov. 14, 1944 |

FOREIGN PATENTS

| Number | Country | Date |
|---|---|---|
| 530,764 | Germany | Aug. 1, 1931 |